US008929465B2

(12) United States Patent
Lee et al.

(10) Patent No.: US 8,929,465 B2
(45) Date of Patent: Jan. 6, 2015

(54) METHODS AND SYSTEMS FOR VEHICLE BROADBAND CONNECTION TO A DATA NETWORK

(71) Applicant: The Boeing Company, Seal Beach, CA (US)

(72) Inventors: Donald B. Lee, Shoreline, WA (US); Timothy M. Mitchell, Seattle, WA (US); Brian E. Ward, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/866,397

(22) Filed: Apr. 19, 2013

(65) Prior Publication Data

US 2014/0314160 A1 Oct. 23, 2014

(51) Int. Cl.
*H04B 3/00* (2006.01)
*H04L 25/00* (2006.01)
*H04B 3/54* (2006.01)

(52) U.S. Cl.
CPC ................................... *H04B 3/544* (2013.01)
USPC .......................................... 375/257; 375/222

(58) Field of Classification Search
USPC ...................................................... 375/257
See application file for complete search history.

(56) References Cited

U.S. PATENT DOCUMENTS

| 7,893,557 | B2 | 2/2011 | Davis et al. | |
|---|---|---|---|---|
| 2002/0160773 | A1* | 10/2002 | Gresham et al. | 455/431 |
| 2005/0143868 | A1 | 6/2005 | Whelan | |
| 2008/0195259 | A1* | 8/2008 | Davis et al. | 701/1 |
| 2008/0217996 | A1 | 9/2008 | Niss | |
| 2010/0329247 | A1* | 12/2010 | Kennedy et al. | 370/389 |
| 2013/0003756 | A1* | 1/2013 | Mitchell et al. | 370/464 |
| 2014/0049099 | A1* | 2/2014 | Sampigethaya et al. | 307/1 |
| 2014/0074321 | A1* | 3/2014 | Lee et al. | 701/3 |

FOREIGN PATENT DOCUMENTS

WO 2008097983 A1 8/2008

OTHER PUBLICATIONS

Extended European Search Report for European Patent Application No. 14157624; Apr. 25, 2014; 6 pages.
U.S. Appl. No. 13/606,119, filed Sep. 7, 2012.

* cited by examiner

*Primary Examiner* — Erin File
(74) *Attorney, Agent, or Firm* — Armstrong Teasdale LLP

(57) ABSTRACT

Methods and systems for communicating data between an aircraft and a ground-based unit are provided. The method includes integrating a Broadband over Power Line (BPL) module and inductive coupler into the ground-based unit, communicatively coupling the aircraft to the ground-based unit, initiating a Broadband over Power Line (BPL) link between the aircraft and the ground-based unit when power is supplied to the aircraft, and updating data stored in the aircraft with data received from the ground-based unit.

20 Claims, 5 Drawing Sheets

METHODS AND SYSTEMS FOR VEHICLE BROADBAND CONNECTION TO A DATA NETWORK

BACKGROUND

This invention relates generally to vehicle communication, and more particularly to vehicle broadband communication via a data network.

As technology has improved, an amount of software and data needed on-board vehicles has increased as well. This increased need for additional software and data management is particularly evident in aircraft information systems. Generally, aircrafts receive off-board data, for use in-flight, through a variety of methods. For example, cellular and/or satellite networks enable an aircraft to communicate to proprietary networks via the internet while the aircraft is in flight. However, such networks are generally limited by cellular or satellite connectivity.

In at least some known commercial airports, a GateLink™ network exists that enables aircraft to communicate wirelessly to an airport data network through the GateLink™ network. However, some commercial aircraft data cannot be sent via wireless networks due to regulations governing aircraft communications. Although such options may be available at some large commercial airports, because of cost limitations and technology limitations, for example, many regional airports and/or military air fields do not have GateLink™ capabilities.

Currently, at least some known wireless off-board communications solutions are required on-board an aircraft to communicate with the airport wireless network connectivity solutions. Broadband over Power Line (BPL) provides a high-bandwidth solution for commercial airports that utilize "wired" 400 Hz aircraft power infrastructure. However, when wired 400 Hz power infrastructure is not available, such as at regional or military air fields, in some instances, the operators may utilize portable self-contained ground power carts to provide alternating current (AC) power to the aircraft while the engines are off. Such methods include extra components for coupling with the aircraft, resulting in reduced data speed and efficiency, and increased component costs.

BRIEF DESCRIPTION

In one aspect, a method for communicating data between an aircraft and a ground-based unit is provided. The method includes integrating a Broadband over Power Line (BPL) module and inductive coupler into the ground-based unit, communicatively coupling the aircraft to the ground-based unit, initiating a Broadband over Power Line (BPL) link between the aircraft and the ground-based unit when power is supplied to the aircraft, and updating data stored in the aircraft with data received from the ground-based unit.

In another aspect, a ground-based power cart configured to transmit data to an aircraft is provided. The ground-based power cart includes an integrated Broadband over Power Line (BPL) module and inductive coupler configured to provide data to the aircraft via a power line and a communications device configured to communicate between the power cart and a ground-based network.

In yet another aspect, a system for communicating between an aircraft and a ground-based unit is provided. The system includes an aircraft and a ground-based power cart communicatively coupled to the aircraft. The ground-based power cart includes an integrated Broadband over Power Line (BPL) module and inductive coupler configured to provide data to the aircraft via a power line and a communications device configured to communicate between the power cart and a ground-based network.

The features, functions, and advantages that have been discussed can be achieved independently in various implementations or may be combined in yet other implementations further details of which can be seen with reference to the following description and drawings.

DETAILED DESCRIPTION

Figure 1:
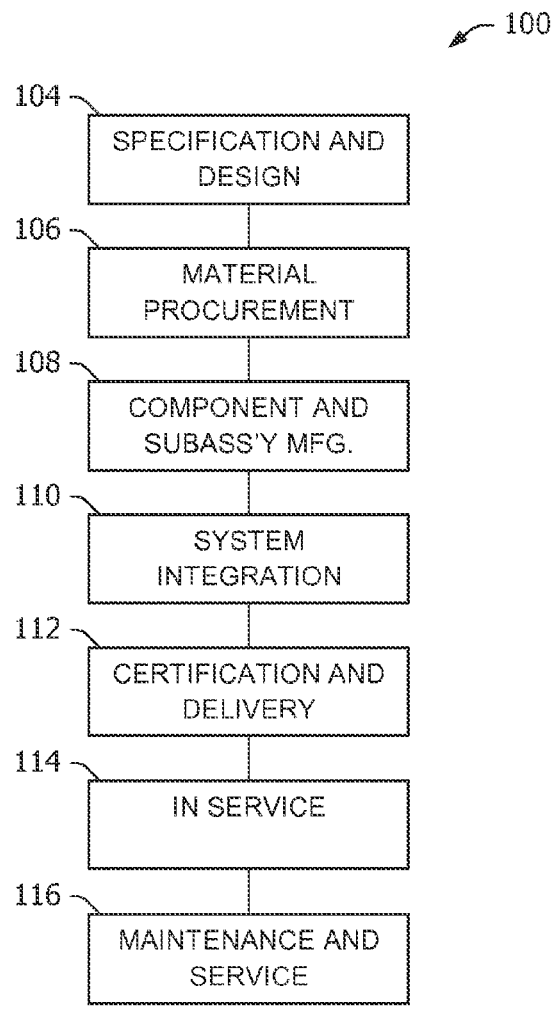
FIG. 1 is a flow diagram of an exemplary aircraft production and service methodology.
Figure 2:
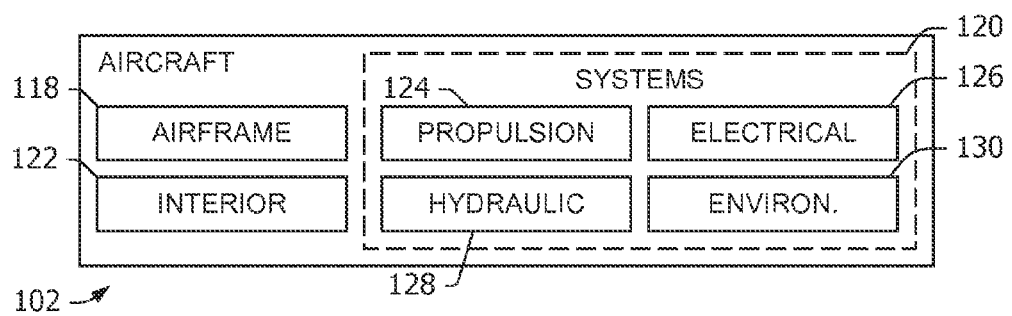
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced via method 100 may include an airframe 118 having a plurality of systems 120 and an interior 122. Examples of high-level systems 120 include one or more of a propulsion system 124, an electrical system 126, a hydraulic system 126, and/or an environmental system 130. Any number of other systems may be included. Although an aircraft example is shown, the principles of the invention may be applied to non-aviation industries, such as the automotive industry.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

Figure 3:
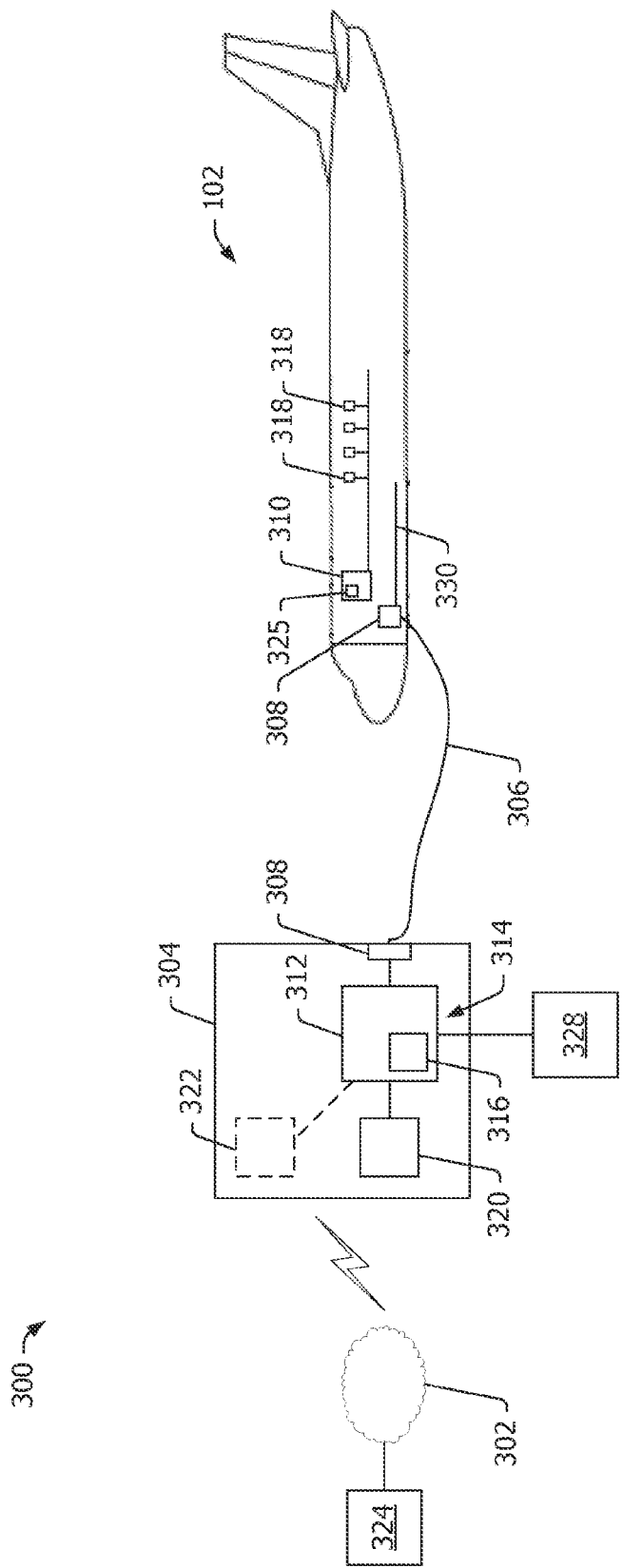
FIG. 3 is a diagram of an exemplary system that enables vehicle broadband communication with a data network.

FIG. 3 is a diagram of an exemplary system 300 for use in facilitating vehicle broadband communication with a data network 302. In the exemplary implementation, system 300 works with an aircraft 102 (shown in FIG. 2) on the ground at an airport (not shown). As used herein the term "airport" refers to any location in which aircraft, such as fixed-wing aircraft, helicopters, and/or blimps, take off and land. System 300 includes a power system 304 that supplies power to aircraft 102. In the exemplary implementation, power system 304 is a ground-based power cart, i.e., a ground power unit, that is mobile and that selectively supplies power to an aircraft parked on the ground at locations at, or adjacent to, the airport. In one implementation, power system 304 may be a conventional power delivery system used at least some known airports. Power system 304 is coupled to aircraft 102 when aircraft 102 is parked at the airport. An electrical cable 306, e.g., a power stinger cable, couples aircraft 102 to power system 304 via at least one stinger socket 308. In one implementation, power system 304 provides 400 Hz power to the aircraft via the electric cable 306. However in alternative implementations, any suitable power for a particular type of aircraft or vehicle may be provided via electric cable 306.

In the exemplary implementation, aircraft 102 includes an on-board BPL module 310, or on-board BPL modem 310, that enables communication via electrical cable 306. More particularly, in the exemplary implementation, on-board BPL modem 310 is capable of communicating with an off-board BPL modem 312, or off-board BPL module 312, included in power system 304. In the exemplary implementation, BPL modem 310 is communicatively coupled to on-board networks 318. On-board networks 318 include various systems, such as, but not limited to, in-flight entertainment systems, avionics systems, flight control systems, flight bag(s), and/or cabin systems.

In the exemplary implementation, power system 304 includes an integrated BPL modem and inductive coupler 314. Integrated BPL modem and inductive coupler 314 includes off-board BPL modem 312 coupled to an inductive coupler 316. Inductive coupler 316 couples BPL modem 312 to electrical cable 306. Inductive coupler 316 also transfers communications signals onto electrical cable 306. Power system 304 also includes a computing device 322 that can communicate directly with aircraft 102 to transfer data to networks 318. In the exemplary implementation, modem 312 is also coupled to a transceiver 320 that is communicatively coupled to ground-based network 302. For example, in one implementation, transceiver 320 is a wireless transceiver that transmits data to/from network 302. Transceiver 320 may be wirelessly coupled to network 302 or physically coupled to network 302 through a wired connection. It should be noted that transceiver 320 may communicate with network 302 using any protocol that enables broadband communication as described herein.

In the exemplary implementation, aircraft 102 receives electrical power from power system 304 via electrical cable 306 and sends/receives data communications to/from ground-based network 302 via cable 306. Moreover, in the exemplary implementation, aircraft 102 communicates via on-board BPL modem 310 using TCP/IP, however any other suitable protocol can be used. In one implementation, encryption is employed to further secure communications between aircraft 102 and ground-based network 302 and/or computing device 322.

Ground-based network 302 may be communicatively coupled to a server 324 that may be operated by the airline or entity that operates aircraft 102. Alternatively, server 324 may be operated by a third-party, such as the airport, an aircraft manufacturer, and/or an aircraft service provider. For example, server 324 may be coupled to ground-based network 302 via a LAN, a WAN, and/or the Internet. Server 324 may transmit data to and from aircraft 102. For example, server 324 may provide software and/or firmware updates to components of aircraft 102, such as cabin systems software, flight bag, and avionics software. Server 324 may also provide content, such as music, movies, and/or internet data such as cached web content for in-flight entertainment systems on aircraft 102. In one implementation, system 300 is used to transfer data between aircraft 102 and ground-based network 302 during a quick-turn of aircraft 102. As used herein, a quick-turn is a quick turn-around time (i.e., less than about 30 minutes) of an aircraft at a gate between passenger deplaning and boarding. During a quick-turn, content of on-board server 324 may be refreshed and data stored on on-board networks 318 during a flight may be transmitted to ground-based network 302.

Although FIG. 3 illustrates power system 304 as being coupled to electrical cable 306 via off-board BPL modem 312, it should be appreciated that other configurations that enable off-board BPL modem 312 to function as described herein are possible. For example, off-board BPL modem 312 may communicate wirelessly with modem 310 when aircraft 102 is directly coupled to power system 304 via electrical cable 306. As another example, off-board BPL modem 312 may be configured to communicate wirelessly with the aircraft via computing device 120 while at the same time, communicate via electrical cable 306 when power is supplied from power system 304 to the aircraft 102.

Figure 4:
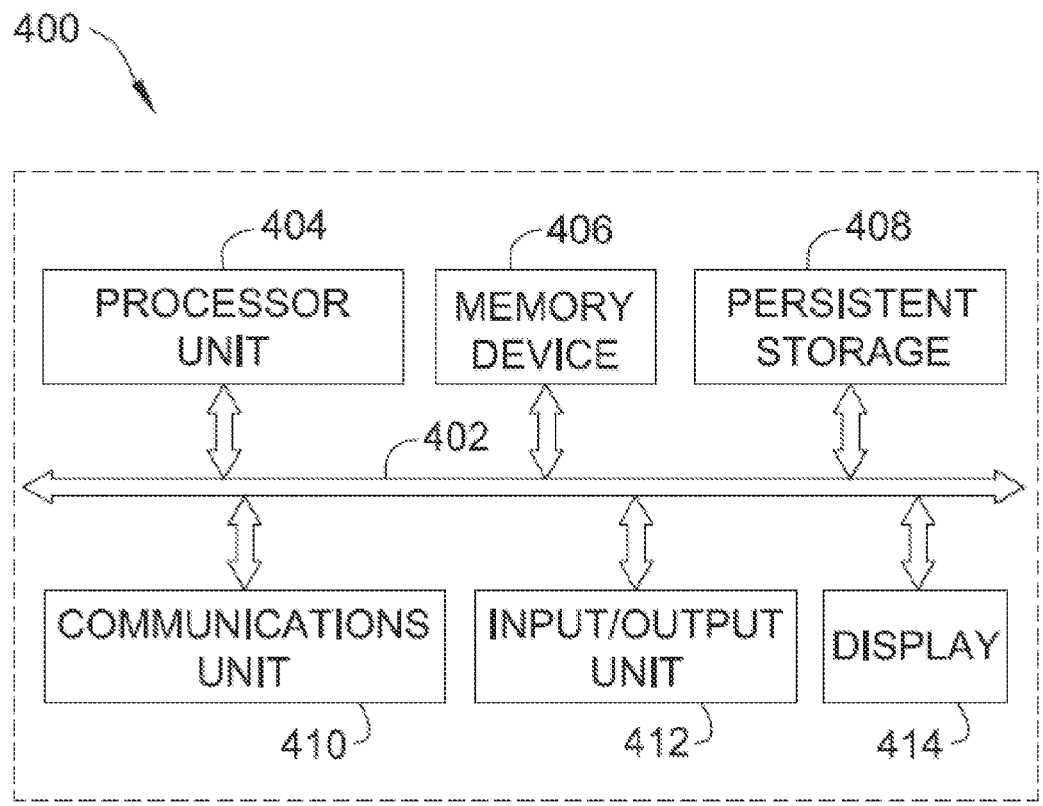
FIG. 4 is a block diagram of an exemplary computing device that may be used with the system shown in FIG. 3.

FIG. 4 is a block diagram of an exemplary computing device 400 that may be used with system 300 (shown in FIG. 3). In the exemplary implementation, computing device 400 is incorporated into power system 304. However, it should be noted that computing device 400 may be a separate device that cooperates with power system 304 such as computing device 322. In the exemplary implementation, computing device 400 includes a communications fabric 402 that enables communications between a processor unit 404, a memory 406, persistent storage 408, a communications unit 410, an input/output (I/O) unit 412, and a presentation interface, such as a display 414. In addition to, or in the alternative, presentation interface 414 may include an audio device (not shown) and/or any device capable of conveying information to a user.

Processor unit 404 executes instructions for software that may be loaded into memory 406. Processor unit 404 may be a set of one or more processors or may include multiple processor cores, depending on the particular implementation. Further, processor unit 404 may be implemented using one or more heterogeneous processor systems in which a main processor is present with secondary processors on a single chip. In another implementation, processor unit 404 may be a homogeneous processor system containing multiple processors of the same type.

Memory 406 and persistent storage 408 are examples of storage devices. As used herein, a storage device is any piece of hardware that is capable of storing information either on a temporary basis and/or a permanent basis. A storage device, such as memory 406 and/or persistent storage 408, may be configured to store data for use with the processes described herein. For example, a storage device may store data needed by networks 318 (shown in FIG. 3) during flight.

Communications unit 410, in the exemplary implementation, enables communications with other computing devices, systems, and/or networks. In the exemplary implementation, communications unit 410 is a BPL modem such as modem 310 and modem 312. In one implementation, communications unit 410 also includes a network interface card. Communications unit 410 may provide communications through the use of physical and/or wireless communication links, such as transceiver 320.

Input/output unit 412 enables input and output of data with other devices that may be connected to computing device 400. For example, without limitation, input/output unit 412 may provide a connection for user input through a user input device, such as a keyboard and/or a mouse. Further, input/output unit 412 may transmit output to a printer. Display 414 provides a mechanism to display information to a user. For example, a presentation interface such as display 414 may display a graphical user interface, such as those described herein.

The different components illustrated herein for computing device 400 are not architectural limitations to the manner in which different implementations may be implemented. Rather, the different illustrative implementations may be implemented in a computer system including components in addition to or in place of those illustrated for computing device 400. For example, other components shown in FIG. 4 can be varied from the illustrative examples shown.

During operation, and referring to FIGS. 3 and 4, aircraft 102 is connected to a ground power unit (GPU), e.g., ground power unit 304, via electric cable 306, e.g., a power stinger cable. The authorized ground personnel activates off-board BPL modem 312 and completes an authentication procedure using off-board BPL modem 312, display 414, and/or I/O unit 412. A pilot, maintenance crewmember, or other authorized user activates an on-board BPL modem, (e.g., on-board BPL modem 310). On-board BPL modem 310 establishes communication with off-board BPL modem 312. Aircraft 102 is then coupled to off-board BPL modem 312 via electric cable 306 and is coupled to ground-based network 302, server 324, computing device 322, and/or the Internet. Communication between aircraft 102 and power unit 304 may be initiated autonomously or at the direction of a user, such as a pilot or ground crew member.

Figure 5:
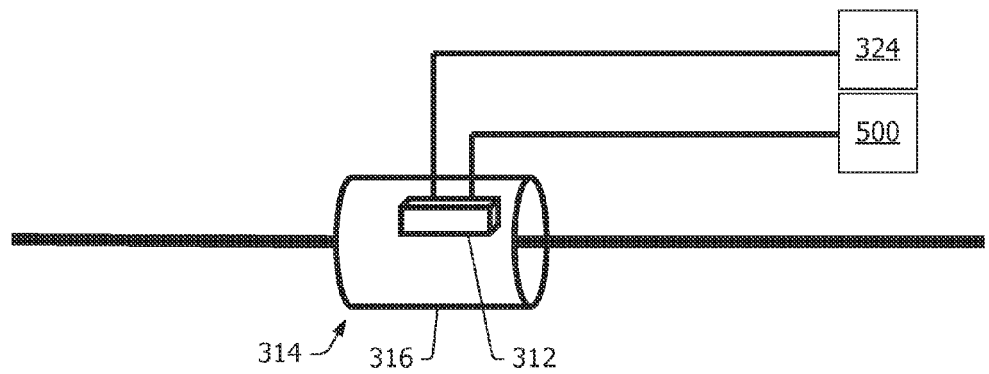
FIG. 5 is a block diagram of the exemplary integrated BPL modem and inductive coupler shown in FIG. 3.

FIG. 5 is a block diagram of an exemplary integrated BPL modem and inductive coupler 314 (shown in FIG. 3). In the exemplary implementation, integrated BPL modem and inductive coupler 314 includes BPL modem 312 (shown in FIG. 3) and inductive coupler 316 (shown in FIG. 3) in a single device. In the exemplary implementation, BPL modem 312 is coupled directly to inductive coupler 316 rather than by an interface cable. Integrated BPL modem and inductive coupler 314 is also coupled to an Ethernet interface 324 (shown in FIG. 3) of aircraft 102. A power supply 500 is coupled to integrated BPL modem and inductive coupler 314 for providing power to BPL modem 312. In one implementation, power supply 500 is an external power supply 328 (shown in FIG. 3) that includes at least one of a power supply conduit and a battery. In another implementation, power supply 500 is a direct current (DC) power bus 330 (shown in FIG. 3) of aircraft 102.

Figure 6:
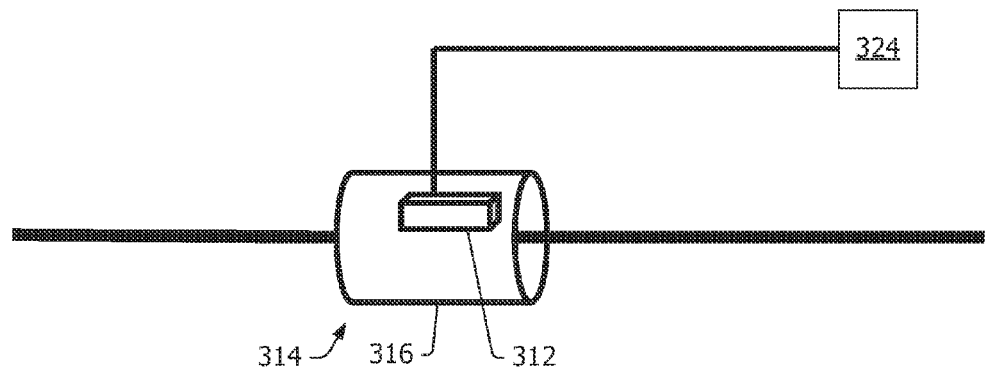
FIG. 6 is a block diagram of an alternative integrated BPL modem and inductive coupler shown in FIG. 3.

FIG. 6 is a block diagram of an alternative integrated BPL modem and inductive coupler 314 (shown in FIG. 3). In the exemplary implementation, integrated BPL modem and inductive coupler 314 includes BPL modem 312 (shown in FIG. 3) and inductive coupler 316 (shown in FIG. 3) in a single device. BPL modem 312 is coupled directly to inductive coupler 316 rather than by an interface cable. Integrated BPL modem and inductive coupler 314 is coupled to Ethernet interface 325 (shown in FIG. 3) of aircraft 102. In the exemplary implementation, Ethernet interface 325 utilizes power over Ethernet (POE) to provide power to BPL modem 312. When power is supplied over Ethernet interface 324 by POE, no additional power supply is required and the cost, size, and complexity of BPL modem 312 is greatly reduced.

Figure 7:
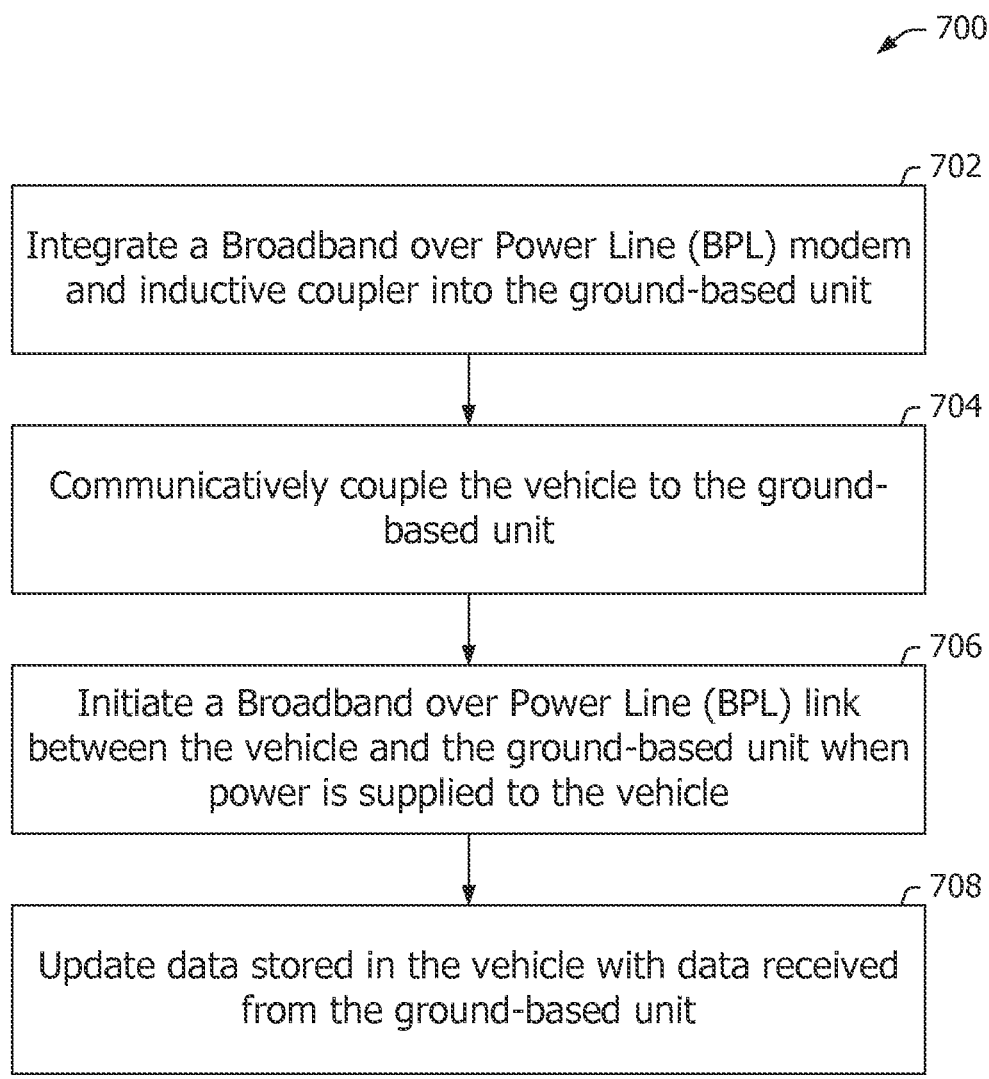
FIG. 7 is a flowchart of an exemplary method that may be implemented to enable vehicle broadband communication with a data network.

FIG. 7 is a flowchart of an exemplary method 700 that may be implemented to enable vehicle broadband communication with a data network. In the exemplary implementation, Broadband over Power Line (BPL) modem and inductive coupler 314 (shown in FIG. 3) is integrated 702 into ground-based unit, such as power unit 304. A vehicle, for example, aircraft 102 (shown in FIG. 2), is coupled 704 to power unit 104 via an electrical cable 306. When power is supplied to the vehicle, a BPL link from modem 310 to modem 312 is initiated 706. In the exemplary implementation, data is then transferred and/or updated 708 between the vehicle and network 302 and/or computing device 322.

An exemplary technical effect of the methods and systems described herein includes at least one of: (a) integrating a Broadband over Power Line (BPL) modem and inductive coupler into the ground-based unit; (b) communicatively coupling the vehicle to the ground-based unit; (c) initiating a Broadband over Power Line (BPL) link between the vehicle and the ground-based unit when power is supplied to the vehicle; and (d) updating data stored in the vehicle with data received from the ground-based unit.

The implementations described herein provide an integrated BPL modem and inductive coupler that enables vehicle broadband communication with a data network. As compared to known communication methods and systems used for airport-based aircraft communications, the above-described implementations provide a smaller and lighter BPL modem and inductive coupler resulting in reduced costs and increased efficiency of BPL communications. The integrated BPL modem and inductive coupler may be installed into new power systems or retrofitted into existing power systems. Moreover, the integrated BPL modem and inductive coupler being a single component facilitates easier installation and reduces the potential for damage during installation. Although aircraft have been used as an example throughout, it is contemplated that other vehicles, such as electric and/or maritime vehicles, may be used with the methods and systems described herein.

It will be understood by those of skill in the art that information and signals may be represented using any of a variety of different technologies and techniques (e.g., data, instructions, commands, information, signals, bits, symbols, and chirps may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred implementations of the present disclosure have been described in detail, it will be understood by those skilled in the art that various modifications can be made therein without departing from the scope of the disclosure as set forth in the appended claims.

A controller, computing device, or computer, such as described herein, including the on and off-board BPL modems, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for communicating data between an aircraft and a ground-based unit, said method comprising:
   integrating a Broadband over Power Line (BPL) module with an inductive coupler into a single device by coupling the BPL module directly to the inductive coupler;
   coupling the integrated BPL module and inductive coupler to a power line of the ground-based unit;
   communicatively coupling the aircraft to the ground-based unit;
   initiating a Broadband over Power Line (BPL) link between the aircraft and the ground-based unit when power is supplied to the aircraft; and
   updating data stored in the aircraft with data received from the ground-based unit.

2. The method in accordance with claim 1, further comprising configuring the integrated BPL module and inductive coupler to provide data to the aircraft via a power line.

3. The method in accordance with claim 1, further comprising powering the integrated BPL module and inductive coupler using a power supply.

4. The method in accordance with claim 3, wherein powering the integrated BPL module and inductive coupler comprises powering the integrated BPL module and inductive coupler using a remote power supply.

5. The method in accordance with claim 3, wherein powering the integrated BPL module and inductive coupler comprises powering the integrated BPL module and inductive coupler using a direct current (DC) bus of the aircraft.

6. The method in accordance with claim 3, wherein powering the integrated BPL module and inductive coupler comprises powering the integrated BPL module and inductive coupler using an Ethernet interface of the aircraft utilizing power over Ethernet.

7. The method in accordance with claim 1, wherein communicatively coupling the aircraft to the ground-based unit further comprises wirelessly coupling the aircraft to the ground-based unit.

8. The method in accordance with claim 1, wherein updating data further comprises updating data using cached web content that may be later accessed.

9. The method in accordance with claim 1, further comprising communicatively coupling the ground-based unit to a ground-based network.

10. A ground-based power cart configured to transmit data to an aircraft, said power cart comprising:
    a Broadband over Power Line (BPL) module coupled directly to an inductive coupler to form an integrated BPL module and inductive coupler device, said integrated BPL module and inductive coupler device coupled to a power line and configured to provide data to the aircraft via the power line; and
    a communications device coupled to said integrated BPL module and inductive coupler, said communications device configured to communicate between said power cart and a ground-based network.

11. A ground-based power cart in accordance with claim 10, wherein said integrated BPL module and inductive coupler is coupled to a power supply.

12. A ground-based power cart in accordance with claim 11, wherein said power supply comprises a remote power supply.

13. A ground-based power cart in accordance with claim 11, wherein said power supply comprises a direct current (DC) bus of the aircraft.

14. A ground-based power cart in accordance with claim 11, wherein said power supply comprises an Ethernet interface of the aircraft utilizing power over Ethernet.

15. A ground-based power cart in accordance with claim 10, wherein said power cart is configured to provide 400 Hz power to the aircraft via the power line.

16. A system for communicating between an aircraft and a ground-based network, said system comprising:
    an aircraft; and
    a ground-based power cart communicatively coupled to said aircraft, said ground-based power cart comprising:
    a Broadband over Power Line (BPL) module coupled directly to an inductive coupler to form an integrated BPL module and inductive coupler device, said integrated BPL module and inductive coupler device coupled to a power line and configured to provide data to said aircraft via the power line; and a communications device coupled to said integrated BPL module and inductive coupler, said communications device configured to communicate between said power cart and a ground-based network.

17. The system in accordance with claim 16, wherein said integrated BPL module and inductive coupler is coupled to a power supply.

18. The system in accordance with claim 17, wherein said power supply comprises a remote power supply.

19. The system in accordance with claim 17, wherein said power supply comprises a direct current (DC) bus of said aircraft.

20. The system in accordance with claim 17, wherein said power supply comprises an Ethernet interface of said aircraft utilizing power over Ethernet.

* * * * *